United States Patent [19]

Caine et al.

[11] Patent Number: 4,710,783
[45] Date of Patent: Dec. 1, 1987

[54] TEMPERATURE COMPENSATED CONTINUOUS TONE THERMAL PRINTER

[75] Inventors: Holden Caine; Scott A. Brownstein, both of Rochester, N.Y.

[73] Assignee: Eastman Kodak Company, Rochester, N.Y.

[21] Appl. No.: 889,140

[22] Filed: Jul. 24, 1986

[51] Int. Cl.[4] .................. G01D 15/10; H04N 1/23; B41J 3/20
[52] U.S. Cl. .................. 346/76 PH; 358/298; 400/120
[58] Field of Search .................. 346/76 PH; 219/216; 358/298; 400/120

[56] References Cited

U.S. PATENT DOCUMENTS

| | | | |
|---|---|---|---|
| 3,874,493 | 4/1975 | Boyd | 400/120 |
| 4,370,666 | 1/1983 | Noda et al. | 346/76 PH |
| 4,391,535 | 7/1983 | Palmer | 400/120 |
| 4,475,114 | 10/1984 | Koyama et al. | 346/76 PH |
| 4,494,126 | 1/1985 | Todoh | 346/76 PH |
| 4,532,523 | 7/1985 | Tanaka | 346/76 PH |
| 4,574,293 | 3/1986 | Inui et al. | 346/76 PH |
| 4,594,501 | 6/1986 | Culley et al. | 219/492 |
| 4,621,271 | 11/1986 | Brownstein | 346/76 PH |

*Primary Examiner*—Clifford C. Shaw
*Assistant Examiner*—Gerald E. Preston
*Attorney, Agent, or Firm*—Raymond L. Owens

[57] ABSTRACT

A continuous tone temperature compensated thermal printing apparatus is described which uses a thermistor that produces a signal representative of the average temperature of a print head. This signal is used to control the pulse width of constant current pulses which are used to energize heating elements of a print head in printing an image pixel.

4 Claims, 6 Drawing Figures

TEMPERATURE COMPENSATED CONTINUOUS TONE THERMAL PRINTER

CROSS REFERENCE TO RELATED APPLICATION

Commonly assigned U.S. patent application Ser. No. 778,960 filed Sept. 23, 1985 entitled "Apparatus and Method for Controlling a Thermal Printer Apparatus" to Brownstein.

BACKGROUND OF THE INVENTION

1. Field of the Invention

The present invention relates to thermal printers wherein the selective energization of heating elements causes the transfer of dye to a receiver member.

2. Description of the Prior Art

Some thermal printer apparatus use a dye transfer process. In this process, a carrier containing a dye is disposed between a receiver, such as paper, and a print head formed of for example a plurality of individual thermal heat producing elements often referred to as heating elements. The receiver and carrier are generally moved relative to the print head which is fixed. When a particular heating element is energized, it is heated and causes dye to transfer (e.g. by sublimation) from the carrier to an image pixel in the receiver. The density, or darkness, of the printed dye is a function of the temperature of the heating element and the time the carrier is heated. In other words, the heat delivered from the heating element to the carrier causes dye to transfer to an image pixel of a receiver. The amount of dye is directly related to the amount of heat transferred to the carrier.

Thermal dye transfer printer apparatus offer the advantage of true "continuous tone" dye density transfer. By varying the heat applied by each heating element to the carrier, a variable dye density image pixel is formed in the receiver.

Typically, the print head is organized into a plurality of groups of heating elements. The heating elements of each group are simultaneously addressed in parallel in a pulse width modulation scheme. In this disclosure, when the term addressed is used, it means that a heating element is capable of being energized. The term enabled means that an addressed heating element is energized. When a heating element is addressed, the time that a heating element is enabled will determine the grey scale of an image pixel. The reason heating elements are addressed in groups is that if all the heating elements were energized at the same time, a large and expensive power supply would be needed. When a group of heating elements is addressed, individual heating elements of the group are selectively energized with constant current pulses. The pulse width of a constant current pulse causes its image pixel to have a desired grey scale. When a group of elements is being addressed or undergoing a heating cycle, all other groups are either cold or cooling. After a group of elements has completed its heating cycle, the next group starts its heating cycle. A heating element in the middle of group that is being addressed and energized generally has neighboring heating elements on both sides that are warm. Accordingly, the temperature profile of the interpixel gap between adjacent heating elements, tends to average to some level. Also, over time, the temperature of the print head tends to equilibrate to an average temperature. The temperature of a heating element on the end of a group can however be significantly reduced due to the heat flow to the cold heating element of the adjacent group which is not being addressed and energized. When dye images are transferred with such a printer, low density streaks, or "group lines" can often appear due to the thermal gradient caused by the temperature difference between heating elements of adjacent groups. Also, as noted above, the temperature of the print head itself tends to equilibrate to some average temperature. This average temperature can itself create another problem in that during operation if this average temperature becomes too high, then images often become too dark. In other words, too much dye is transferred to each image pixel. The reason for this is that the average temperature of the heating elements in the print head can increase to a point where it can cause a noticeable amount of additional dye to be transferred.

In order to solve the problem of the average temperature of the print head being too high, the duration of the address signals have been reduced, but the frequency of these address signals is unchanged. The maximum pulse width of constant current pulses that can be provided is reduced. This process effectively reduces the number of density (grey) levels since the maximum time a heating element can be energized is limited by the address signal width rather than the data from the microcomputer.

In another approach to solve this problem, just as in the above-discussed approach, the duration of the address signals are reduced but the frequency of these address signals are maintained at a constant. The difference in this approach is that the frequency of the enable signals is increased so there will be the same number of grey levels available. Viewed differently, the pulse width of the address pulses is adjusted. The maximum pulse width of the constant current pulse that can be provided is reduced but the maximum number of pulse width levels is maintained. This method requires complex circuitry. The modulation data must be processed at a higher speed. The thermal print head must also be able to operate at a higher frequency.

It should be noted that with both these arrangements, the group line effect problem is still not solved.

SUMMARY OF THE INVENTION

It is an object of this invention to provide a thermal printer apparatus which reduces the current drawn by the heating elements, eliminates group line effects and corrects for temperature changes in the average temperature of the print head.

This object is achieved by a continuous tone temperature compensated thermal printer apparatus including a print head having a plurality of heating elements, each such heating element being addressable a plurality of times and selectively energized when addressed with a constant current pulse to cause a dye image pixel to be formed in a receiver member, the improvement comprising: (a) means for producing a signal representative of the average temperature of the print head; and (b) means responsive to such signal for adjusting the pulse width of the constant current pulses applied to the heating elements when forming image pixels.

An important feature of this invention is that the overall quality of a dye image can be significantly improved.

BRIEF DESCRITION OF THE DRAWINGS

DESCRIPTION OF THE PREFERRED EMBODIMENT

Figure 1:
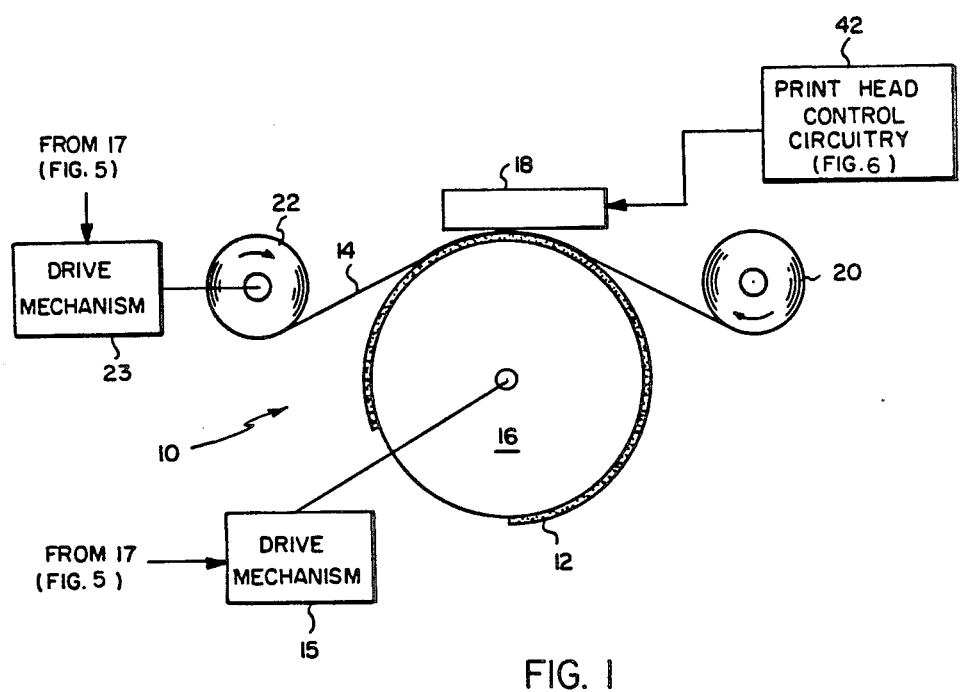
FIG. 1 is a schematic of a thermal printer apparatus which can be employed to make continuous tone dye images in accordance with the invention.

Referring now to FIG. 1, there is shown a thermal printer apparatus 10 which is adapted to print color images on a receiver member 12 from dyes transferred from a carrier member 14. The receiver member 12 is in the form of a sheet. It is secured to a rotatable drum 16 which is mechanically coupled to a drive mechanism 15. The drive mechanism 15 continuously advances the drum 16 and the receiver sheet 12 past a stationary thermal print head 18. The print head 18 has a plurality of heating elements (resistors) which are shown more clearly in FIG. 3. These heating elements press the carrier member 14 against the receiver sheet 12. The carrier member 14 is shown in the form of a web and is driven from a supply roller 20 onto a take-up roller 22 by a drive mechanism 23 coupled to the take-up roller 22. The drive mechanisms 15 and 23, each include motors. These motors continuously advance the carrier and the receiver, respectively, relative to the heating elements of the print head 18. During printing, the heating elements are addressed and selectively energized as the carrier and receiver are continuously advanced. Accordingly, the resultant dye image pixel will be somewhat larger than if the carrier and receiver were stationary during dye transfer. The movement of the carrier is necessary to reduce sticking of the carrier to the heating elements in the print head 18.

Figure 2:
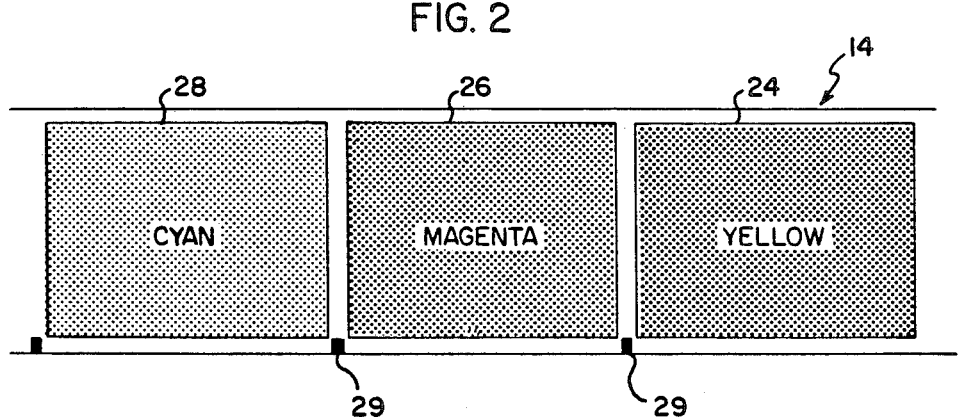
FIG. 2 is a top view of a carrier for use in the thermal printer apparatus of FIG. 1.

In FIG. 2 the carrier member 14 is shown in the form of a web with a repeating sequence of sections or frames of thermally transferable dye. Each frame in a sequence has a different color heat transferable dye. For example, each sequence of frames includes a frame of yellow thermally transferable dye 24, followed by a frame of magenta thermally transferable dye 26, followed by a frame of cyan thermally transferable dye 28. This sequence of yellow, magneta and cyan dye frames is of course repeated. Reference marks 29 are shown which can be used in the well known manner to control the operation of the drive mechanisms 15 and 23.

With reference to FIG. 1, the operation of the apparatus will be briefly described. Drive signals are continuously provided to the drive mechanism 15 from a microcomputer 17 (see FIG. 5) to rotate the drum 16 to bring successive areas of the receiver sheet 12 into the print region opposite print head 18. A portion of a dye frame of the carrier member 14 is disposed between the print head 18 and the receiver sheet 12. Both the receiver and the carrier members are moved relative to the print head during this printing operation.

Figure 5:
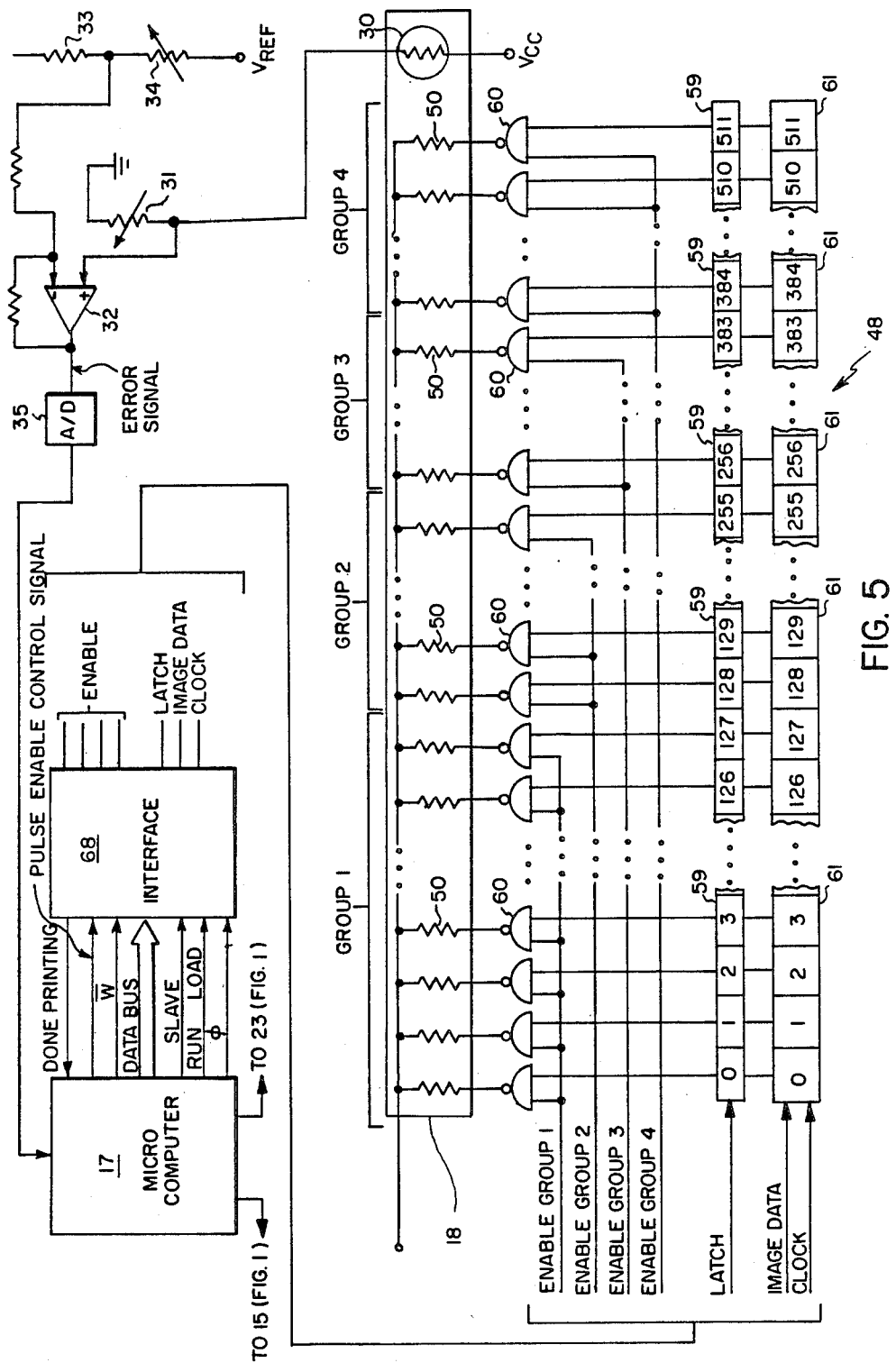
FIG. 5 is a schematic of the control circuit for operating the heating elements in the print head of the thermal printer apparatus of FIG. 1.
Figure 6:
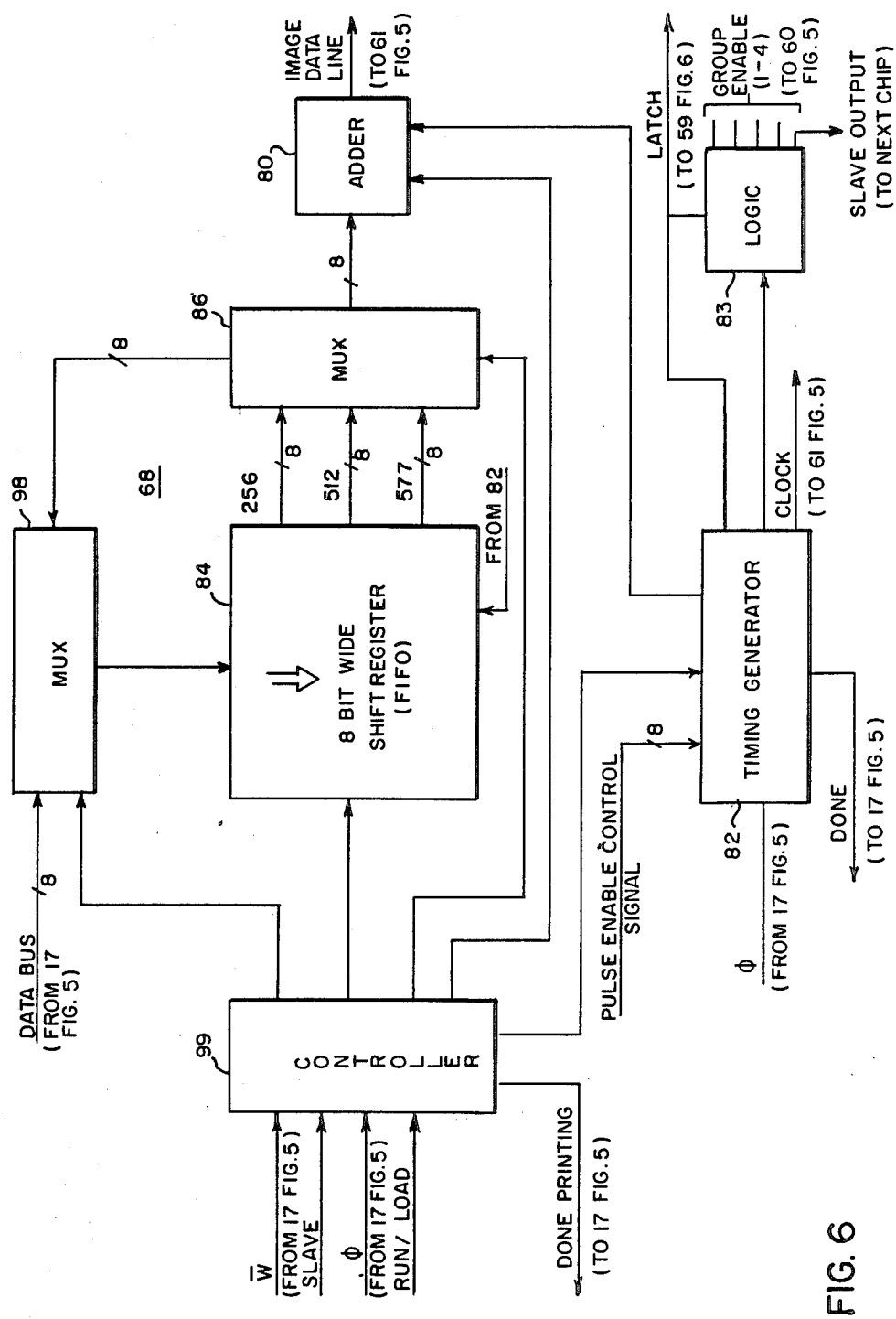
FIG. 6 is a schematic of the control circuit 68 shown in FIG. 5.

Turning briefly to FIG. 5, it is noted that the microcomputer 17 provides a write signal ($\overline{W}$), a clock signal $\phi$, a pulse enable control signal and data signals over a data bus to a control circuit 68 which is disclosed in more detail in FIG. 6. The data signals are 8 bit digital signals or words which represent the dye density levels of image pixels. In response to signals provided by the control circuit 68, address and enabling signals are supplied to heating elements of the print head 18 by circuitry 68 causing dye to transfer from the carrier to the receiver. A "done printing" line from circuit 68 tells the microcomputer 17 when a line of image pixels has been printed. A thermistor 30 provides a signal representative of the average temperature of the print head 18. This signal produced by the thermistor 30 is used to control the pulse width of the constant current pulses applied to the heating resistors as will be described later.

Turning again to FIG. 1, as the receiver member 12 moves through the print region, the selective energization of heating elements of a group results in the printing of a color image on the receiver. The process by which the heating elements are energized will be described later. The color of this image is determined by the color of the thermally transferable dye contained in each frame of the carrier member 14 that is being driven past the print region. After one complete color frame of an image has been printed, receiver 12 is returned to an initial, or home position. Carrier member 14 is advanced to move another color frame into position for printing, and print head 18 is selectively energized so as to print the next color frame of the image superimposed onto the previously printed image.

Figure 3:
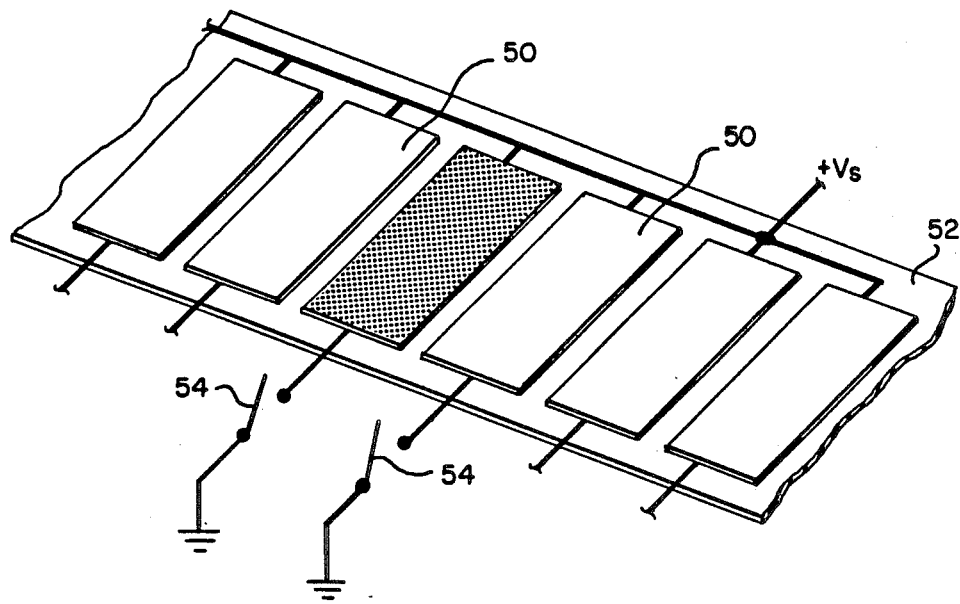
FIG. 3 is a perspective of several heating elements used in the print head of the thermal printing apparatus of FIG. 1.

FIG. 3 shows in schematic form several heating elements 50 of the print head 18. Each heating element 50 is made of a thin film of a resistive material, which is mounted on a non-conductive support 52. When a switch 54 is closed, a constant current pulse flows through the heating element. Although thin film heating elements are shown, it will be understood that thick film heating elements can also be used in accordance with the invention.

Returning to FIG. 5, the resistance of thermistor 30 is a direct function of the average temperature of the print head 18. A potential Vcc is applied to thermistor 30 and at the junction of the thermistor 30 and an adjustable resistor 31, a voltage signal is produced. This voltage signal is applied to the noninverting input of an operational amplifier 32. A reference voltage is applied to the inverting input of operational amplifier 32. This voltage is produced at the junction of resistors 33 and 34 in the well known manner. The level of the applied voltage is adjusted by changing the resistance of resistor 34. Operational amplifier 32 produces an analog error signal which represents the difference in the average temperature of the print head 18 from some desired average temperature level. This signal is digitized by an analog to digital converter 35 and applied as an input to the microcomputer 17. In response to this digital input signal, the microcomputer 17 produces the pulse enable control signal which has 8 bits. This signal represents the pulse width of the constant current pulses which will compensate for changes in the average temperature of the print head 18 from some desired level. For example, if the average temperature is above a desired level, then the pulse width will be reduced. Also, the microcomputer 17 includes a frame store which stores signals representing the colored digital images to be printed. The color of each colored image pixel is represented by an 8-bit word which is applied over the data bus to control circuitry 68. Control circuitry 68 produces group enable signals. The duration of these signals adjusts the pulse width of the constant current pulses which are applied to each heating element.

Figure 4:
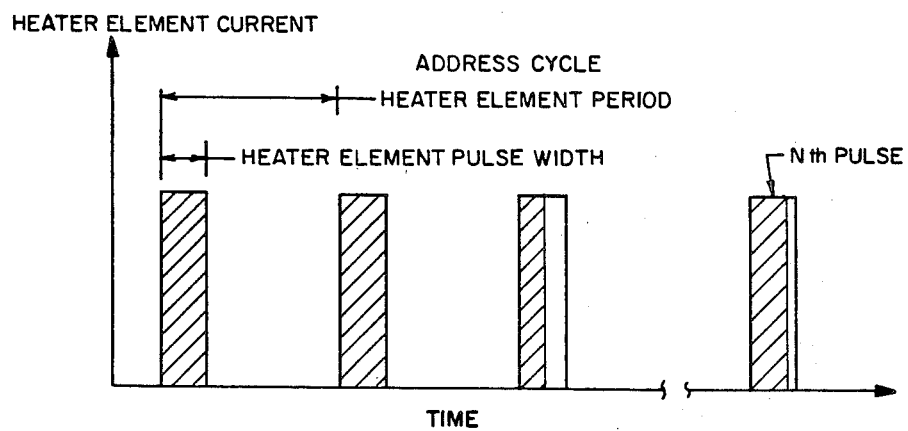
FIG. 4 illustrates the pulse width adjustable constant current pulses which are applied to a single heating element in accordance with the invention.

FIG. 4 shows adjustable constant current pulses applied to a single heating element 50 during an address cycle to form an image pixel. During an address cycle, an individual heating element is addressed a predetermined number of times (N). This predetermined number N also represents the number of possible dye density levels. In other words, there are N possible current pulses in an address cycle for each heating element of a group. Each time a heating element is addressed, only a single current pulse can be applied to it. After all of the groups of heating elements have been addressed one time, the address process is repeated N−1 times for each group until the address cycle is completed. At this time, a line of image pixels having a particular color will have been printed. By changing the "on-time" or duration of the group enable signals to each heating element of a group, the constant current pulse width is changed to compensate for changes in the average temperature of the print head 18. The shaded portions of the constant current pulses shows that they are adjustable to compensate for changes in the average temperature of the print head.

In FIG. 5, control circuit 68 under the control of the microcomputer 17 provides clock signals to a shift register 61. For the sake of example, we will assume there are 512 heating elements in print head 18. The clock signal clocks in image data from the control circuit 68 into the shift register 61 until all of its 512 stages either contain a high (1) or a low (0) signal level or state. A latch signal provided by the control circuitry 68 causes data in each stage of the shift register 61 to be entered into a corresponding stage of a latch 59. A high enable signal held on the output of a latch is connected to a corresponding Nand gate 60. Each group of Nand gates 60 is addressed in sequence. When a group enable signal is high, and a group is addressed, a circuit is completed through heating resistors 50 and the Nand gates 60 which have their corresponding latch stages in a high state. In other words, a heating element is energized. The pulse duration or pulse width is controlled by the time that the group enable signal is high. After the group I enable signal is turned low, only the group II enable signal is turned high (the others are still low). As shown, there are four group enable signals, and they are energized in sequence. When each group has been addressed one time, all the 512 heating elements 50 of the print head may have been energized one time, depending on the state of their corresponding stages in latch 59. The length of time that a group enable signal is held high is a function of the error signal provided by the analog-to-digital converter 35 to the microcomputer 17. Now let us assume there are 256 possible dye density levels. In other words N=256. The shift register 61 will have to be loaded with data 256 different times. Each group of heating elements will be addressed 256 times. The length of time that each enable signal is on is a direct function of the average temperature of the print head 18 as measured by the thermistor 30. Each heating element will be selectively energized 256 different times depending on the desired pixel dye density.

Turning now to FIG. 6, the control circuit 68 is shown in detail. An adder 80 provides a stream of serial bits (image data) to the shift register 61. An image data digital signal has one bit for each stage in the shift register 61. The number (N) of such image data digital signals for each line of pixels is equal to the maximum number of dye density levels. We will continue with our example where there are 256 possible dye density levels for each dye image pixel. During the printing of a line, there will be 256 latch signals provided by a timing generator 82. The timing generator 82 also provides the clock signals to the shift register 61 and also signals to logic 83. Logic 83 in turn produces the group enable signals. Group enable signals address the different groups. The length of time that a group enable signal is on controls the pulse width of a constant current pulse applied to the heating resistors as discussed above. An 8-bit pulse enable control signal from the microcomputer 17 provides the timing generator 82 with the information needed to determine the length of time that the group enable signal should be on.

There is provided a FIFO (first in first out) dynamic shift register 84 which is 8 bits wide. It contains an adjustable number of words, one for each heating element in a line in the print head 18. In our example there are 512, 8-bit words. The controller 99 can change the number of words held in FIFO 84 by providing appropriate control signals to multiplexers 86 and 98 and FIFO 84. In operation, in response to a control signal from controller 99, multiplexer 98 takes an 8-bit word on the data bus representing the grey scale or dye density level of a pixel and applies it into a pixel position of the FIFO 84. This process is continued until an entire line of data representing 512 pixels is loaded. Each value stored in the FIFO represents the modulation or grey level for one of the heating elements 50 in the thermal print head 18. The controller 99 then provides a signal to the multiplexer 86 which removes one digital pixel at a time (8 bits) and applies it to an adder 80. The order of removal is of course "first in first out" or FIFO. The adder 80 adds "1" to the value at the output of the shift register. After the number "1" has been added to the number, the updated number is recirculated back through multiplexer 98 into the top or first position in the FIFO 84. This operation and the control of shifting data words in the FIFO 84 is provided by control signals from the controller 99. The contents of each data word in the FIFO is recirculated 256 times. Another output of the adder 80 provides the image data digital signal which is applied to the shift register 61 shown in FIG. 5. The following example will explain the operation of circuit 68. During the address or heating cycle, the output of the FIFO 84 is connected to the input of the adder 80 by the multiplexer 86. Normally, the number "1" is added to the digital word present at the input of the adder 80, the sum being stored back into the input of the FIFO 84 via the multiplexer 98, and a high level will be produced on the image data output. However, if the input to the adder 80 is the digital word representing the decimal number 255, the adder 80 is disabled by the controller 99. The number 255 is stored, unaltered, into the input of the FIFO 84 and a low level will be produced on the image data output. The low level on the image data output will turn off the heating element 50 corresponding to the location in the FIFO 84 containing the number 255. Thus, if a heating element 50 is not to be turned on (corresponding to a minimum density pixel) during an address cycle, then the digital word representing the decimal number 255 is applied to the input of the adder 80. In a similar fashion, if the maximum density (256 grey levels) is desired at a heating element 50, the number "0" is initially provided to the input of the adder 80.

In order to provide the control signals for the multiplexers 86 and 98, the controller 99 responds to a low level run/load signal, provided by the microcomputer 17. The rising edge of $\overline{W}$ indicates to the controller 99 that there are valid commands on the data bus from the microcomputer 17. The controller 99 provides a signal to the multiplexer 86 which causes a number from the FIFO to be delivered to the adder 80 and also causes the multiplexer 98 to receive the output of the adder 80 and apply it as an input to the FIFO 84. After 512 data words are entered into the FIFO shift register, the run/load signal turns high. Each of the 512 data words in the FIFO 84 in response to clock signal $\phi$ are recirculated through the adder 80 the appropriate number of times causing image pixel data to be transferred to the shift register 61. After a line is printed, the controller 99 provides a "done printing" signal to the microcomputer 17. In response to the done printing signal, the microcomputer 17 provides a low level run/load signal indicating that the process starts over again and a new line of data is loaded into the FIFO 84.

In our example, we have described our print head as having 512 heating elements. However, the electrical system can be adapted to operate with print heads that have different numbers of heating elements to produce different numbers of image pixels.

If a line of image pixels is to have 512 pixels, then the controller 99 signals the MVX 86 to receive pixel data from the 512th position of the FIFO 84. Similarly, if 577 image pixels are in a line, then the MVX 86 receives pixel data from the 577th position of the FIFO. Also, if 256 image pixels are to be provided, then the controller 99 signals MVX 86 to receive pixel data from the 256 positions of FIFO 84.

Logic 83 provides four separate group enable signals. By changing the enable on time while printing, print density nonuniformity caused by changes in the temperature of the print head 18 from a desired level is minimized.

It should also be noted that there is a line labeled SLAVE which is applied as an input to the controller 99. Controller 99 in response to the slave signal provides a control signal to the timing generator 82 which controls the logic 83. Logic 83 energizes a second circuit which has the same organization as the control circuit 68. The second circuit can be used to control the operation of another thermal print head which can be disposed adjacent to the first thermal print head if it is desired to print a line which has more heating elements than available in the first print head. Alternatively, the second circuit can be used to control the operation of a print head which has two separate input data ports. This arrangement can be referred to as a master slave arrangement.

The invention has been described in detail with particular reference to a certain preferred embodiment thereof, but it will be understood that variations and modifications can be effected within the spirit and scope of the invention.

We claim:

1. In a continuous tone thermal printing apparatus including a print head having a plurality of heating elements, one for each image pixel formed into a plurality of groups of heating elements, the heating elements of each group being simultaneously addressable in parallel N different times and selectively energizable when addressed with constant current pulses to provide N different possible temperature levels, the improvement comprising:
   (a) a shift register having one operative stage for each heating element;
   (b) a digital memory for holding a selectable number of dye density words, each such word being representative of the dye density level of a particular image pixel;
   (c) logic means responsive to the dye density words for sequentially storing N image data digital signals in the stages of the storage device in which the state of each stage corresponds to whether or not a corresponding heating element is to be selectively energized;
   (d) means for sequentially addressing the groups of heating elements each time one of the N image data digital signal is stored in the storage device with each group of heating elements being addressed N separate times;
   (e) means for producing a signal representative of the average temperature of the print head; and
   (f) means responsive to such average temperature signal for selectively energizing each heating element each time it is addressed and for adjusting the pulse width of the constant current pulse applied to the heating elements.

2. The invention as set forth in claim 1, wherein said digital memory includes means for changing the number of dye density words when the number of image pixels is changed.

3. The invention as set forth in claim 3, including means for changing the number of operative stages of said shift register when the number of image pixels is changed.

4. Continuous tone thermal printer apparatus comprising
   (a) a print heat having a number of heating elements, one for each image pixel,
   (b) a storage device having a plurality of stages, one for each heating element,
   (c) means for addressing N pulses to each thermal pixel in order to obtain N different possible thermal temperature levels for the thermal pixels, levels which depend upon corresponding signals stored in the stages of the storage device,
   (d) means for selectively energizing each heating element each time it is addressed depending upon the state of its corresponding stage,
   (e) means for assembling the heating elements into a plurality of groups, the heating elements of each group being simultaneously addressable in parallel,
   (f) means for sequentially addressing each group of heating elements during the thermal decay of the other groups,
   (g) means for producing a signal representative of the average temperature of the print head, and
   (h) means responsive to such average temperature signal for selectively energizing each heating element each time it is addressed with a constant current pulse and for adjusting the pulse width of such constant current pulse applied to the heating elements.

* * * * *